United States Patent
Yeo et al.

(10) Patent No.: US 10,251,035 B2
(45) Date of Patent: Apr. 2, 2019

(54) CONTROL METHOD AND APPARATUS FOR CARRIER SENSING IN WIRELESS SENSOR COMMUNICATION

(71) Applicant: ELECTRONICS AND TELECOMMUNICATIONS RESEARCH INSTITUTE, Daejeon (KR)

(72) Inventors: Geon Min Yeo, Daejeon-si (KR); Young Il Kim, Daejeon-si (KR); Dae Geun Park, Daejeon-si (KR); Soon Yong Song, Daejeon-si (KR); Yong Tae Lee, Daejeon-si (KR); Hyun Woo Lee, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 133 days.

(21) Appl. No.: 15/361,194

(22) Filed: Nov. 25, 2016

(65) Prior Publication Data
US 2017/0156021 A1   Jun. 1, 2017

(30) Foreign Application Priority Data

Nov. 26, 2015 (KR) .................. 10-2015-0166780
Nov. 1, 2016   (KR) .................. 10-2016-0144448

(51) Int. Cl.
*H04W 4/70* (2018.01)
*H04W 74/08* (2009.01)
(Continued)

(52) U.S. Cl.
CPC ......... *H04W 4/70* (2018.02); *H04W 52/0216* (2013.01); *H04W 74/0808* (2013.01);
(Continued)

(58) Field of Classification Search
CPC ............... H04W 4/70; H04W 74/0808; H04W 52/0216; H04W 74/002; H04W 84/20; Y02D 70/144
See application file for complete search history.

(56) References Cited

U.S. PATENT DOCUMENTS

2007/0064625 A1    3/2007  Lim et al.
2011/0219367 A1*   9/2011  Lee ..................... H04W 8/245
                                                    717/173
(Continued)

FOREIGN PATENT DOCUMENTS

KR      10-0718094 B1      5/2007
KR   10-2013-0102250 A     9/2013
(Continued)

OTHER PUBLICATIONS

IEEE Computer Society, IEEE Std 802.15.4-011, Sep. 5, 2011, IEEE, pp. 1-314.*

*Primary Examiner* — Omar J Ghowrwal
(74) *Attorney, Agent, or Firm* — LRK Patent Law Firm

(57) ABSTRACT

A control method for collision avoidance in low power wireless sensor communication including a center node and a plurality of neighbor nodes includes assigning a seed to a neighbor node associated with a center node, updating, by the neighbor node, the seed at each radio frame, determining, by the neighbor node, a criterion for performing communication, and transmitting data in a next slot according to a result of carrier sensing is provided.

17 Claims, 8 Drawing Sheets

(51) Int. Cl.
*H04W 52/02* (2009.01)
*H04W 74/00* (2009.01)
*H04W 84/20* (2009.01)

(52) U.S. Cl.
CPC .......... *H04W 74/002* (2013.01); *H04W 84/20* (2013.01); *Y02D 70/144* (2018.01)

(56) References Cited

U.S. PATENT DOCUMENTS

2012/0020336 A1    1/2012  Bahr et al.
2013/0304938 A1*  11/2013  Hayes .................... H04L 45/22
                                                                       709/239

FOREIGN PATENT DOCUMENTS

KR    10-2015-0059589 A    6/2015
KR    10-2016-0028354 A    3/2016

* cited by examiner

CONTROL METHOD AND APPARATUS FOR CARRIER SENSING IN WIRELESS SENSOR COMMUNICATION

CROSS-REFERENCE TO RELATED APPLICATION(S)

This application claims priority to Korean Patent Application Nos. 10-2015-0166780, filed Nov. 26, 2015, and 10-2016-0144448, filed Nov. 1, 2016, in the Korean Intellectual Property Office, the disclosure of which is incorporated herein by reference in its entirety.

BACKGROUND

1. Field

The following description relates to wireless communication, and more particularly, to a wireless sensor communication method in a network including a plurality of wireless sensor neighbor nodes.

2. Description of Related Art

Wireless sensor communication is a communication method for transmitting sensing information generated from a plurality of sensors (a plurality of neighbor nodes) forming a sensor network via wireless communication to a final destination. Wireless sensor communication is implemented in a shorter range than mobile communication, has a data rate lower than that of the mobile communication, and operates generally on a battery in harsh environments where wired power supply is difficult. Since wireless sensor communication needs to be operated in situations in which power is limited, transmission radio waves also have limited intensity, and a relatively short coverage area is formed. In order to expand the communication area which is limited due to the low transmission power in wireless sensor communication, there is a need for an apparatus corresponding to a mobile communication relay.

IEEE802.15.4 is a standard which defines the physical layer (PHY) and media access control layer (MAC), and further includes a definition of an interface between PHY/MAC layers for lower power communication and upper layers for application service. As for the performance level of wireless sensor communication in IEEE802.15.4, using Offset Quadrature Phase Shift Keying (OQPSK) modulation ensures maximum data rates of 250 kbps, and IEEE802.15.4 does not include a basic channel coding mechanism to provide lower power consumption.

There are various delay elements in data transmission in a contention association period (CAP) of IEEE802.15.4, for example, Backoff and Carrier sensing. A long latency indicates that RF power corresponding to the latency is continuously consumed. Also, when a collision between different neighbor nodes occurs, the same operation needs to be repeated, and thus when there are a plurality of neighbor nodes, transmission performance through CAP is significantly degraded. That is, when a personal area network (PAN) is composed of a plurality of neighbor nodes according to IEEE802.15.4, data transmission through CAP has a number of possible collisions and latency, and thus it is difficult to configure a stable sensor network.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a control apparatus and method for collision avoidance in low power wireless sensor communication that is capable of improving transmission performance in a contention access period while reducing power consumption by preventing latency and collision that may occur in wireless sensor communication.

A control method for collision avoidance in low power wireless sensor communication according to the present invention provides a communication control method for avoiding collision in a contention access period in low power wireless sensor communication including a center node and a plurality of neighbor nodes.

In one general aspect, a control method for collision avoidance in low power wireless sensor communication includes: assigning a seed to a neighbor node associated with a center node; updating, by the neighbor node, the seed at each radio frame; determining, by the neighbor node, a criterion for performing communication; and transmitting data in a next slot according to a result of carrier sensing.

The assigning of the seed to the neighbor node may be performed by: sending, by the center node, beacon information to the neighbor node; transmitting, by the neighbor node, an association request to the center node according to the beacon information received from the center node; and assigning, by the center node, a seed to the neighbor node by transmitting association information in response to the association request received from the neighbor node.

The association information may include one of association response information and beacon information, and the association information may include a total number of associated neighbor nodes, a size of a contention access period (from a start point of the contention access period to an end point of the contention access period), a short address, and seed information. The association request may include information about an extended address.

The extended address represents a unique identifier of a particular node (including a center node), for example, with 64 bits in IEEE802.15.4, and the short address represents a unique identifier assigned to a neighbor node by a center node only in a PAN with 16 bits in IEEE802.15.4, in which a center node is assigned a short address by the center node.

The transmitting of the data in the next slot according to the result of carrier sensing may include transmitting data in the next slot during a carrier idle status, and not transmitting data during a carrier busy status.

Specifically, the transmitting of the data in a next slot according to the result of carrier sensing may be achieved by immediately transmitting data in a first slot of a contention access period; and performing carrier sensing in an $n^{th}$ slot of the contention access period and transmitting data in a slot following the $n^{th}$ slot during a carrier idle status.

In the updating of the seed by the neighbor node, a seed value may decrease one at a time, and the seed may be assigned in a cycle of a total number of the associated neighbor nodes.

The associating of the neighbor node and assigning of the seed to the neighbor node by the center node through association information may include transmitting, by the center node, beacon information to the neighbor node, transmitting, by the neighbor node having received the beacon information, an association request to the center node, and transmitting, by the center node, the association information to the neighbor node based on the received association request.

In another aspect, a center node for collision avoidance control in low power wireless sensor communication including a center node and a plurality of neighbor nodes is provided. The center node is configured to send beacon information to the neighbor node and to assign a seed to the neighbor node by transmitting association information in response to an association request received from the neighbor node.

In another aspect, a neighbor node for collision avoidance control in low power wireless sensor communication including a center node and a plurality of neighbor nodes is provided. The neighbor node is configured to transmit an association request to the center node, update a seed assigned by the center node at each radio frame, perform carrier sensing by determining a criterion for performing communication, and transmit data in a next slot.

Other features and aspects will be apparent from the following detailed description, drawings, and claims.

BRIEF DESCRIPTION OF THE DRAWINGS

Throughout the drawings and the detailed description, unless otherwise described, the same reference numerals will be understood to refer to the same elements, features, and structures. The relative size and depiction of these elements may be exaggerated for clarity, illustration, and convenience.

DETAILED DESCRIPTION

Hereinafter, exemplary embodiments of the present invention will be described in detail with reference to the accompanying drawings, and the following description is intended to aid in the understanding of the method, apparatus, and/or system described in the specification but is illustrative in purpose only and is not to be construed as limiting the present invention. In the description of the embodiments, the detailed description of related known functions or constructions will be omitted to avoid obscuring the subject matter of the present invention. In addition, terms which will be described below are defined in consideration of functions in the embodiments of the present invention, and may vary with an intention of a user and an operator or a custom. Accordingly, the definition of the terms should be determined based on the overall content of the specification. It should be understood that the terms used in the specification and the appended claims are not to be construed as limited to general dictionary meanings, but should be interpreted based on meanings and concepts corresponding to technical aspects of the present invention on the basis of the principle that the inventor is allowed to define terms appropriately for the best explanation.

Figure 1:
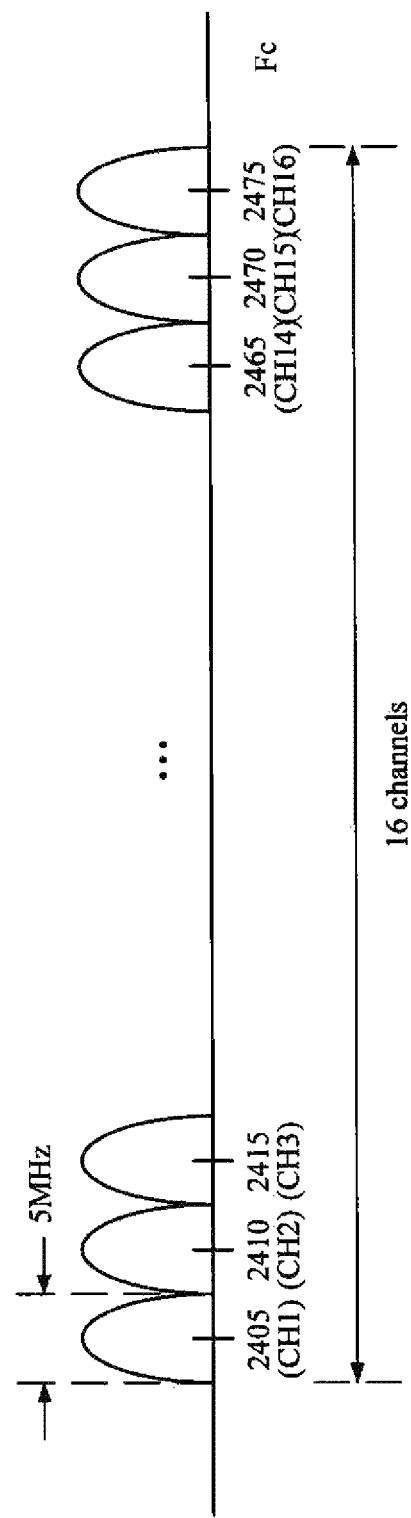
FIG. 1 is a diagram illustrating an example of a configuration of IEEE802.15.4 channels.

FIG. 1 is a diagram illustrating an example of a configuration of IEEE802.15.4 channels.

Referring to FIG. 1, IEEE802.15.4, a representative example of an international standard for wireless sensor communication, specifies an interface between PHY/MAC layers for low power communication and upper layers for application services. As for the performance level of IEEE802.15.4, using Offset Quadrature Phase Shift Keying (OQPSK) ensures a maximum data rate of 250 kbps, and IEEE802.15.4 does not include a basic channel coding mechanism for lower power consumption.

According to IEEE802.15.4, in a 2.4 GHz band, sixteen channels are operated in units of 5 MHz. For each channel, a single personal area network (PAN) may be constructed, and a single PAN serves as a basic unit forming a sensor network. When constructing a PAN, a coordinator selects a single channel and periodically sends a beacon through the channel, and devices in a coverage area in which the beacon is sensed join the coverage area to construct the PAN.

Figure 2:
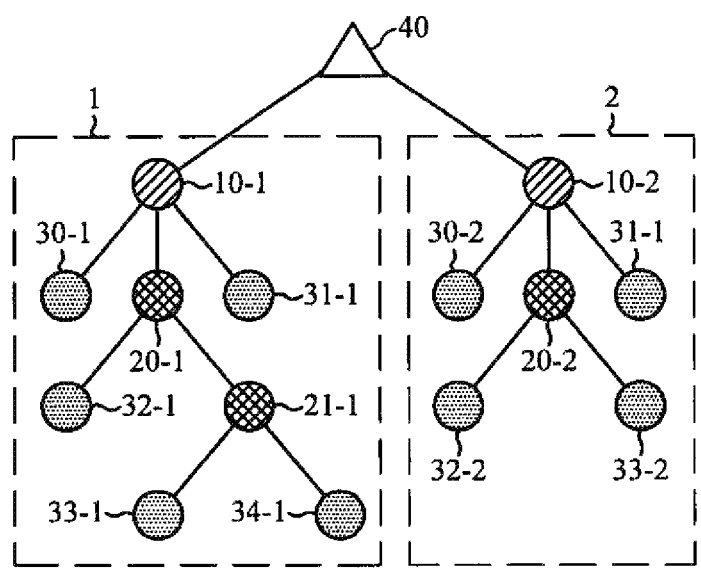
FIG. 2 is a diagram illustrating an example of a configuration of a hierarchical sensor network.
Figure 2:
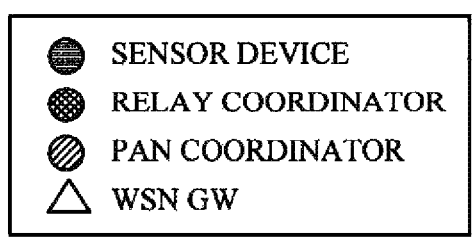

FIG. 2 is a diagram illustrating an example of a configuration of a hierarchical sensor network.

Referring to FIG. 2, sensors (neighbor nodes) of a wireless sensor network constructed based on wireless sensor communication are connected to a server (not shown) connected to a wired Internet backbone network through a gateway 40. PANs 1 and 2 may be extended in a cluster tree structure. That is, in an overlapping coverage area, there may be a number of PANs each having a different channel.

The PANs 1 and 2 are respectively managed by PAN coordinators 10-1 and 10-2 which are topmost neighbor nodes connected to the gateway 40, and a plurality of sensor neighbor nodes 30-1, 30-2; 31-1, 31-2 or relay coordinators 20-1, 20-2 may be connected to the PAN coordinators 10-1 and 10-2, respectively. A plurality of sensor neighbor nodes 32-1; 32-2, 33-2 or another relay coordinator 21-1 may be connected to the relay coordinators 20-1 and 20-2. That is, a single PAN is formed on a single channel, and the single channel serves as a wireless resource which is shared by all the sensors, coordinators, and the PAN coordinator.

Figure 3:
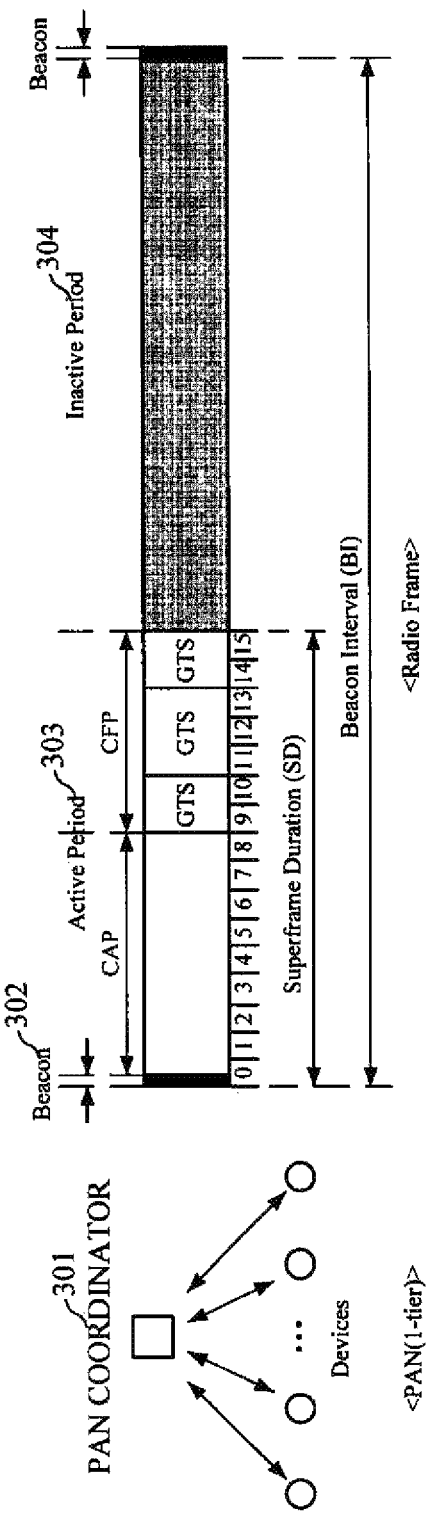
FIG. 3 is a diagram illustrating an example of a 1-tier personal area network (PAN) structure in IEEE802.15.4.

FIG. 3 is a diagram illustrating an example of a 1-tier personal area network (PAN) structure in IEEE802.15.4.

Referring to FIG. 3, In IEEE802.15.4, sixteen channels are operated in units of 5 MHz. For each channel, a single personal area network (PAN) is constructed, and the PAN serves as a basic unit forming a sensor network. FIG. 3 is an example of a PAN and a radio frame for a unit channel provided by IEEE802.15.4, which illustrates a 1-tier PAN structure having a plurality of neighbor nodes associated with a PAN coordinator 301.

The PAN coordinator 301 broadcasts a beacon 302 including information related to configuration of the PAN at equal beacon intervals, and devices within the PAN perform data transmission/reception while synchronized with the beacon. An active period 303 is a period in which data transmission is performed, and an inactive period 304 is a period in which data transmission is not performed. Data transmission through the active period 303 is achieved in two methods, one method using a contention access period (CAP), the other method using a contention free period (CFP).

In the CAP, transmission is performed based on Carrier Sensing Multiple Access-Collision Avoidance (CSMA-CA), and in the CFP, transmission is performed based on a Guaranteed Time Slot (GTS) which is a slot dedicated exclusively to a particular device. That is, in the CAP, all devices within a PAN may transmit or receive data at any time, and thus a transmission collision may occur when different devices perform transmission at the same time. In the CFP, a unique transmission/reception time for a particular device (GTS) is allocated to the particular device to avoid transmission collision.

Figure 4A:
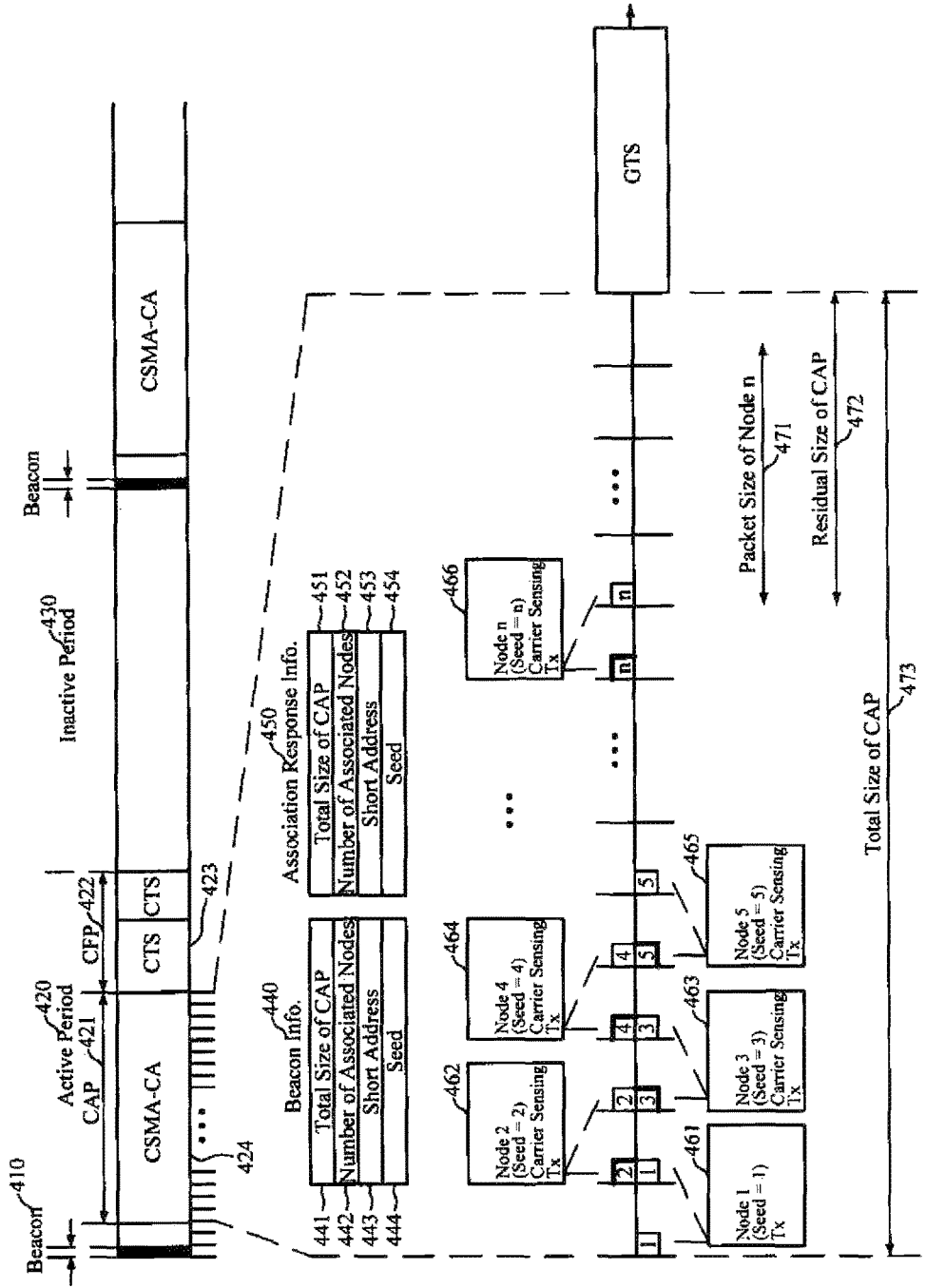
FIG. 4A is a diagram illustrating a radio frame structure of a control apparatus for collision avoidance in low power wireless sensor communication according to an exemplary embodiment of the present invention.

FIG. 4A is a diagram illustrating a radio frame structure of a control apparatus for collision avoidance in low power wireless sensor communication according to an exemplary embodiment of the present invention.

Figure 4B:
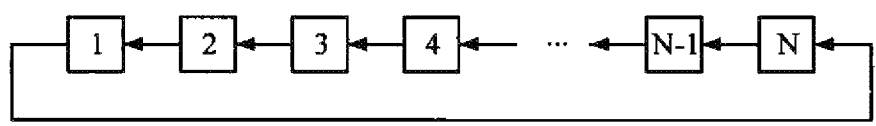
FIG. 4B is a diagram illustrating a seed update sequence of a control apparatus for collision avoidance in low power wireless sensor communication according to an exemplary embodiment of the present invention.

FIG. 4B is a diagram illustrating a seed update sequence of a control apparatus for collision avoidance in low power wireless sensor communication according to an exemplary embodiment of the present invention.

Referring to FIGS. 4A and 4B, in a control apparatus for collision avoidance in low power wireless sensor communication according to the present invention, a single radio frame is defined as an interval for transmitting a beacon 410. The beacon 410 includes beacon information about all neighbor nodes within a single PAN.

The radio frame is divided into an active period 420 in which communication is performed and an inactive period 430. The active period 420 includes a CAP 421 in which contention-based transmission is performed and a CFP 422 which is exclusively used by, a single neighbor node. The CFP 422 includes a GTS which is allocated to a single neighbor node. In FIG. 4A, the CAP includes Unit Backoff Slots, and the Unit Backoff Slots represent points of time at which carrier sensing and transmission basically begin through the CAP.

Neighbor nodes forming the low power wireless sensor communication (or PAN) each have a unique seed. The seed of the neighbor node is assigned by a center node in the process of the neighbor node being initial association with the low power wireless sensor communication (or PAN). The initial association process may be performed in the existing CSMA-CA method.

In the assigning of the seed, the neighbor node is assigned a seed as a value which is a total number of associated nodes including the neighbor node. The seed has a range between 1 and N when the total number of associated nodes is N.

The seed initially assigned to each neighbor node by the center node is updated at each frame. In the updating of the seed, the seed is updated according to Equation 1 below. That is, according to Equation 1, a seed value decreases by one with each frame. FIG. 4B illustrates a seed updating process which has a circular structure. In the updating of the seed by the neighbor node, the seed value decreases one at a time, and the seed assignment is performed in a cycle of the total number of associated neighbor nodes.

$$[Seed=Seed-1], \text{ if } 2 \leq Seed \leq N$$

$$[Seed=N], \text{ if } Seed=1] \quad [\text{Equation 1}]$$

For example, when it is assumed that, the total number of associated nodes is 10, a seed of a first neighbor node in the current frame has a value of 1, and then the seed of the first neighbor node is updated to 10 in the next frame. When a seed of the first neighbor node in the current frame has a value of 10, the seed is updated to 9 in the next frame. Accordingly, all the associated neighbor nodes have seeds that vary according to respective radio frames.

Because the neighbor node may fail to receive a beacon, the neighbor node usually needs to update the seed in a frame in which the neighbor node fails to receive a beacon by using a timer of the neighbor node.

Beacon information 440 includes a total size 441 of the CAP 421 in the current frame, a total number 442 of neighbor nodes having been associated by the current frame, a short address 443 assigned to a neighbor node having requested association, and a seed 444 assigned to a neighbor node having requested association.

Association response information 450 is a response transferred from the center node to the neighbor node having requested association. The association response information 450 includes a total size 451 of the CAP in the current frame, a total number 452 of neighbor nodes having been associated by the current frame, a short address 453 assigned to a neighbor node having requested association, and a seed 454 assigned to a neighbor node having requested association.

The center node of the control apparatus for collision avoidance in low power wireless sensor communication according to an embodiment transfers one of the beacon information 440 and the association response information 450 in response to the neighbor node having requested association. The neighbor node having requested association of the center node is assigned a seed by receiving the beacon information 440 or the association response information 450 from the center node.

Hereinafter, a process of controlling communication among a plurality of neighbor nodes that form wireless sensor communication by the control apparatus for collision avoidance in low power wireless sensor communication according to the present invention will be exemplarily described.

In a start slot of the CAP 421, a neighbor node Node 1 having a seed of 1 (Seed=1) in the current frame unconditionally transmits (Tx) data when there is data to be transmitted (461). A neighbor node Node 2 having a seed of 2 (Seed=2) performs carrier sensing in a second slot, and transmits (Tx) data in a third slot during a carrier idle status (that is, when a neighbor node having a seed of 1, for example, the first neighbor node, has transmitted no data or has completed data transmission) (462).

A third neighbor node Node 3 having a seed of 3 (Seed=3) performs carrier sensing in the third slot, and transmits (Tx) data in a fourth slot during a carrier idle status (that is, a neighbor node corresponding to Seed=1 or Seed=2 has transmitted no data or has completed data transmission) (463). A fourth neighbor node Node 4 having a seed of 4 (Seed=4) performs carrier sensing in the fourth slot, and transmits (Tx) data in a fifth slot during a carrier idle status (that is, a neighbor node corresponding to Seed=1, Seed=2, or Seed=3 has transmitted no data or has completed data transmission) (464).

A fifth neighbor node Node 5 having a seed of 5 (Seed=5) performs carrier sensing in the fifth slot, and transmits (Tx) data in a sixth slot during a carrier idle status (that is, a neighbor node corresponding to Seed=1, Seed=2, Seed=3, or Seed=4 has transmitted no data or has completed data transmission) (465). By repeating the above process, each neighbor node performs carrier sensing in a corresponding one of the slots with respect to neighbor nodes preceding the neighbor node, and transmits data in a next slot during a carrier idle status.

That is, each neighbor transmits the data in the next slot when the carrier is not determined to be busy as a result of the carrier sensing, and does not transmit the data in the next slot when the carrier is determined to be busy.

In this case, each neighbor node is aware of a corresponding slot for the neighbor node to perform the carrier sensing and is aware of packet size 472 of the neighbor node. Also, each neighbor node is aware of whether carrier sensing and transmission (Tx) are able to be performed before a start point of GTS 423. For example, each neighbor node may determine whether to perform carrier sensing and transmission (Tx) by determining a criterion for performing communication which corresponds to Equation 2 below.

[Total Size of CAP−Seed]≥[Packet Size of Node n], if Seed≥1

[Total Size of CAP−Seed+1]≥[Packet Size of Node n], if Seed≥2     [Equation 2]

In Equation 2, Total Size of CAP 473 represents a total size of the CAP of the current frame, Packet Size of Node n 471 represents a packet size of a corresponding neighbor node, and Residual Size of CAP of Node n 472 represents a residual size of the CAP. [Total Size of CAP−Seed+1] represents the maximum number of slots which allows for transmission of a neighbor node n, and thus coincides with [Residual Size of CAP of Node n] shown in FIG. 4A. That is, [Total Size of CAP−Seed+1]=Residual Size of CAP of Node n is satisfied. Accordingly, only when the number of slots to perform transmission is larger than the packet size, transmission is performed.

Total Size of CAP 473, Packet Size of Node n 471, and Residual Size of CAP 472 may be expressed by the number of Unit Backoff Slots. The neighbor node is configured to perform carrier sensing and perform transmission in the carrier idle status when Equation 2 is satisfied, and to not perform carrier sensing and transmission when Equation 2 is not satisfied.

The control apparatus for collision avoidance in low power wireless sensor communication according to the present invention allows each neighbor node to perform carrier sensing in a corresponding slot with respect to neighbor nodes preceding the neighbor node, and transmit data in a next slot in a carrier idle status according to the radio frame structure and operation principle illustrated in FIGS. 4A and 4B, thereby transmitting data without collision in the CAP. Accordingly, reduced latency is ensured when compared to the existing carrier sense multiple access with collision avoidance (CSMA-CA) method, thus performing collision avoidance in low power wireless sensor communication.

Figure 5A:
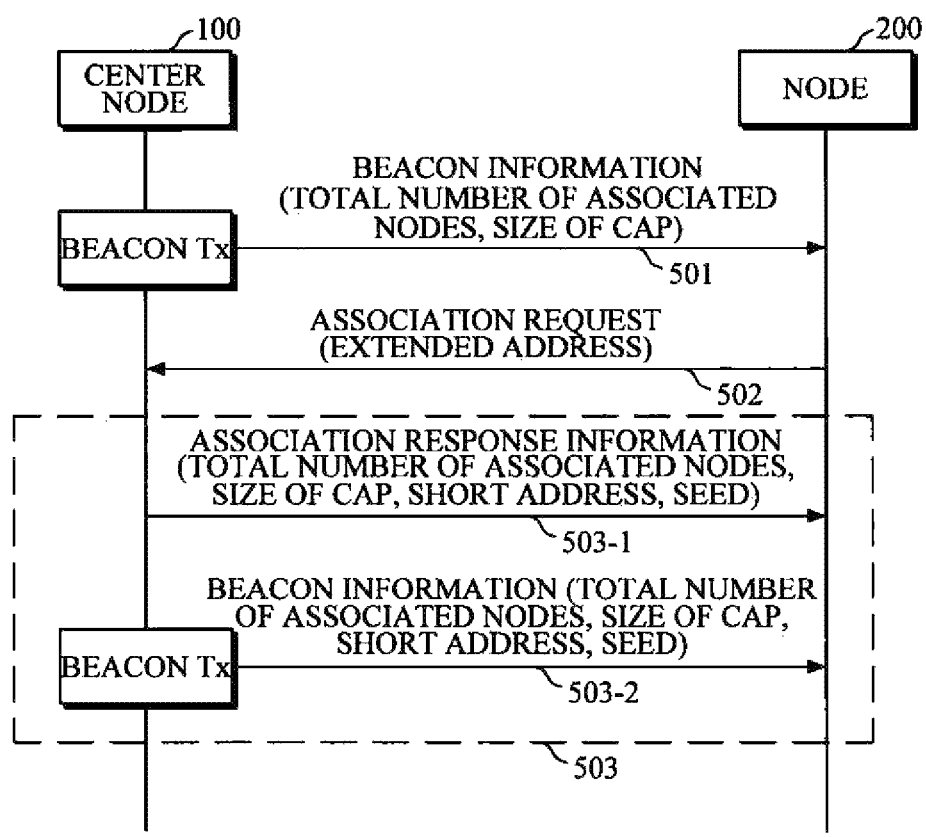
FIG. 5A is a flowchart showing a neighbor node association procedure of a control apparatus for collision avoidance in low power wireless sensor communication according to an exemplary embodiment of the present invention.

FIG. 5A is a flowchart showing a neighbor node association procedure of a control apparatus for collision avoidance in low power wireless sensor communication according to an exemplary embodiment of the present invention.

Referring to FIG. 5A, a control apparatus for collision avoidance in low power wireless sensor communication according to an exemplary embodiment of the present invention performs collision avoidance transmission according to the procedure of operations shown in FIG. 4. For the sake of convenience of description, low power wireless sensor communication having a single neighbor node 200 associated with a center node 100 is taken as an example in FIGS. 5A and 5B. However, in low power wireless sensor communication or a PAN configured with low power wireless sensor communication, the number of neighbor nodes is not limited to a predetermined number, and may be freely adjusted according to the type of the PAN.

The center node 100 transmits beacon information to the neighbor node 200 through beacon transmission (501). The beacon information includes information about the total number of associated nodes by the current frame and the size of CAP.

The neighbor node 200 having received the beacon information from the center node 100 requests association and a seed assignment from the center node 100 through an association request (502). In this case, the association request transmitted from the neighbor node 200 to the center node includes an extended address.

Upon receiving the association request from the neighbor node 200, the center node 100 transmits association information to the neighbor node 200 in response to the received association request. In this case, the center node 100 transmits one of association response information 503-1 and beacon information 503-2 as the association information in response to the received association request, thereby performing an association procedure for the neighbor node 200. The association response information and the beacon information, which are transmitted from the center node 100 to the neighbor node 200, each include information about the total number of associated neighbor nodes, the size of a CAP, a short address, and a seed. Different neighbor nodes 200 are each assigned a different seed based on the association information (association response information or beacon information) received from the center node 100.

Figure 5B:
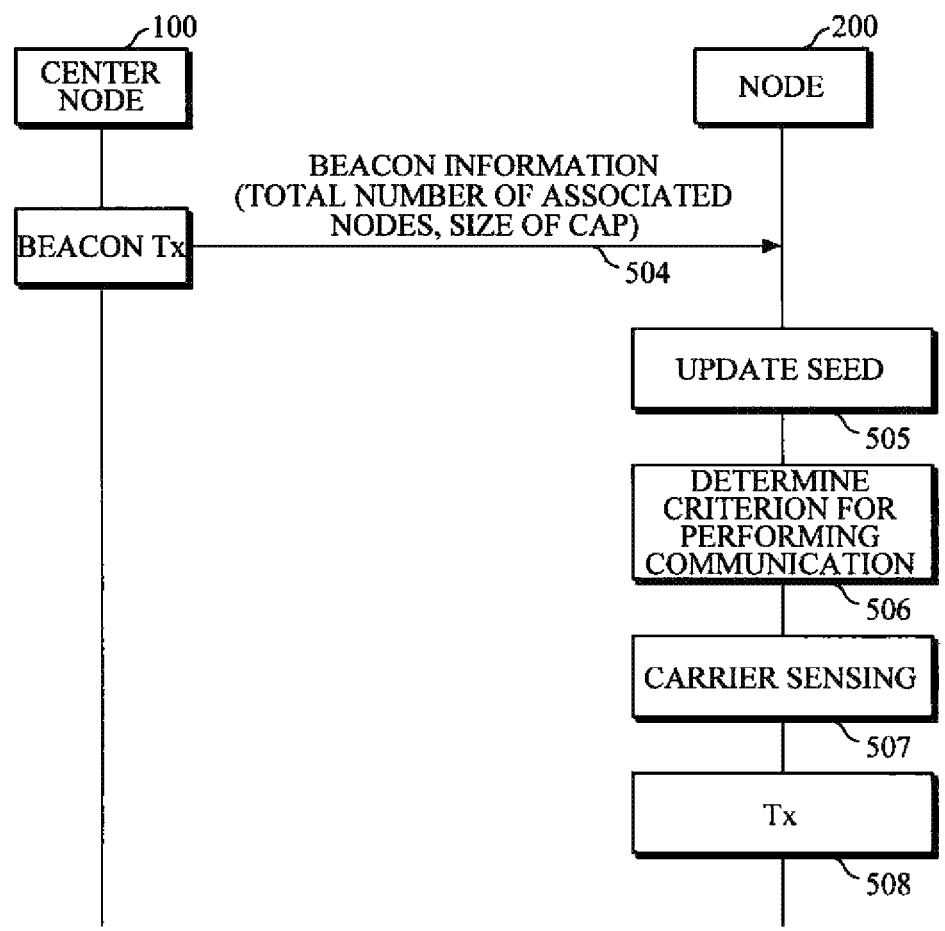
FIG. 5B is a flowchart showing a collision avoidance communication procedure of a control apparatus for collision avoidance in low power wireless sensor communication according to an exemplary embodiment of the present invention.

FIG. 5B is a flowchart showing a collision avoidance communication procedure of a control apparatus for collision avoidance in low power wireless sensor communication according to an exemplary embodiment of the present invention.

Referring to FIG. 5B, each neighbor node 200 is assigned a different seed from the center node 100 through operations 501 and 503-2 in FIG. 5A. The seed assigned to each neighbor node 200 is updated with a new seed at each frame. First, upon receiving beacon information from the center node 100 (504), the neighbor node 200 assigned a seed updates the seed according to Equation 1 (505). Thus, all the associated neighbor nodes 200 are assigned seeds that vary according to respective radio frames.

The neighbor node 200 that has updated the seed determines whether a criterion for performing communication is satisfied through Equation 2 (506). Each neighbor node is aware of a corresponding slot for the neighbor node to perform carrier sensing, and is also aware of the packet size of the neighbor node. Therefore, each neighbor node may determine whether to perform carrier sensing and transmission (Tx) by determining a criterion for performing communication which corresponds to Equation 2. The neighbor node performs carrier sensing and transmission when the criterion for performing communication is satisfied, and does not perform carrier sensing or transmission when Equation 2 is not satisfied.

When the criterion for performing communication is satisfied, the neighbor node performs carrier sensing (507). The neighbor node determines whether the communication status is idle or busy through the carrier sensing, and determines whether to perform transmission based on a result of the determination of the communication status. Each neighbor node 200 transmits data in the next slot, when the carrier is determined to be idle (not busy) through the carrier sensing (508), and does not transmit data in the next slot when the carrier is determined to be busy.

Figure 6:
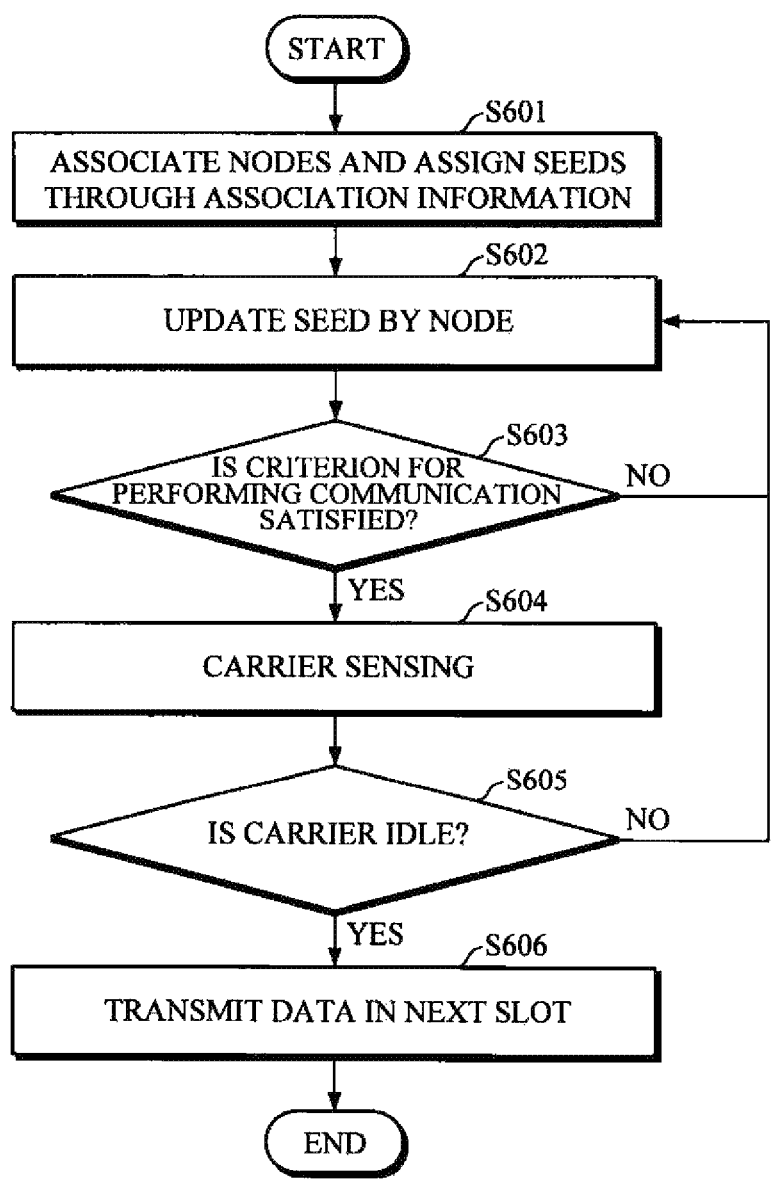
FIG. 6 is a flowchart showing a control method for collision avoidance in low power wireless sensor communication according to an exemplary embodiment of the present invention.

FIG. 6 is a flowchart showing a control method for collision avoidance in low power wireless sensor communication according to an exemplary embodiment of the present invention.

Referring to FIG. 6, a control method for collision avoidance in low power wireless sensor communication according to an exemplary embodiment of the present invention includes the center node allowing one or more neighbor nodes to be associated with the center node and assigning seeds to the respective neighbor nodes by transmitting association information to the one or more neighbor nodes (S601). The associating of the center node and the neighbor node includes the center node transmitting beacon information to the neighbor nodes, the neighbor nodes transmitting association requests to the center node. And then the center node assigning seeds to the neighbor nodes and associating the neighbor nodes with the center node by transferring association information which includes association response information or beacon information according to the association requests of the neighbor nodes. The association information includes information about a total number of associated neighbor nodes, a size of a CAP, a shot address, and a seed.

In order for the associated neighbor node to perform data transmission, the assigned seed is updated (S602). Upon receiving beacon information from the center node, the neighbor node that was assigned a seed updates the seed according to Equation 2 so that all neighbor nodes are assigned new seeds.

The neighbor node that has updated the seed determines whether a criterion for performing communication is satisfied (S603). Whether the criterion for performing communication is satisfied is determined by determining whether Equation 3 described with reference to FIG. 4 is satisfied. When the criterion for performing communication is satisfied, the neighbor node determines that carrier sensing and data transmission (sending) are possible. Meanwhile, the neighbor node does not perform carrier sensing or data transmission (sending) when the criterion for performing communication is not satisfied.

When the criterion for performing communication is satisfied, the neighbor node performs carrier sensing (S604). The neighbor node determines whether a carrier status is idle through the carrier sensing (S605). When the carrier status is idle, the neighbor node transmits data in a next slot (S606). Meanwhile, when the carrier status is determined to be busy, the neighbor node does not transmit data in the next slot. In this case, the carrier sensing and data transmitting by the neighbor node are sequentially performed for each slot as described with reference to FIG. 4.

As is apparent from the above, the control apparatus and method for collision avoidance in low power wireless sensor communication according to the present invention can reduce latency and collision by providing a mechanism different from a mechanism used in the existing CSMA-CA transmission method.

In particular, when a single personal area network (PAN) is composed of a plurality of neighbor nodes according to the control apparatus and method for collision avoidance in low power wireless sensor communication according to the present invention, latency and collision occurring in data transmission through a contention channel can be prevented, thereby providing a network with a stable configuration.

In addition, the control apparatus and method for collision avoidance in low power wireless sensor communication according to the present invention can ensure versatility by reducing power consumption, improving IEEE802.15.4, as well as allowing for contention-based transmission in wireless communication or mobile communication.

The current embodiments can be implemented as computer readable codes in a computer readable recording medium. Codes and code segments constituting the computer program can be easily inferred by a skilled computer programmer in the art. The computer readable recording medium includes all types of recording media in which computer readable data is stored. Examples of the computer readable recording medium include a ROM, a RAM, a CD-ROM, a magnetic tape, a floppy disk, and an optical data storage. Further, the recording medium may be implemented in the form of carrier waves such as Internet transmission. In addition, the computer readable recording medium may be distributed to computer systems over a network in which computer readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented with other components or their equivalents.

What is claimed is:

1. A control method for collision avoidance in wireless sensor communication including a center node and a plurality of neighbor nodes, the control method of a neighbor node comprising:
  obtaining, by the neighbor node, a seed which is set to a total number of neighbor nodes associated with the center node from the center node associated with the neighbor node;
  updating, by the neighbor node, the seed at each radio frame;
  performing, by the neighbor node, a carrier sensing operation in a slot #n which is determined based on the updated seed, wherein the updated seed is the n; and,
  when the slot #n is determined to be an idle state by the carrier sensing operation, transmitting, by the neighbor node, data in a slot #(n+1) after the slot #n determined by the updated seed,
  wherein the n is an integer more than 0.

2. The control method of claim 1, wherein the obtaining comprises:
  receiving, by the neighbor node, beacon information from the center node;
  transmitting, by the neighbor node, an association request to the center node according to the beacon information received from the center node; and
  obtaining, by the neighbor node, the seed from the center node by receiving association information in response to the association request transmitted to the center node.

3. The control method of claim 2, wherein the association information includes one of association response information and beacon information.

4. The control method of claim 2, wherein the association information includes a total number of associated neighbor nodes, a size of a contention access period, a short address, and seed information.

5. The control method of claim 2, wherein the association request includes information about an extended address.

6. The control method of claim 1, further comprising determining of the criterion for performing communication by the neighbor node, communication is performed when a maximum number of slots for the neighbor node to transmit the data is equal to or larger than a packet size of the neighbor node after updating the seed at each radio frame.

7. The control method of claim 1, wherein, in the updating of the seed, at each radio frame, a seed value decreases one at a time, and the seed is assigned in a cycle of a total, number of the associated neighbor nodes.

8. The control method of claim 1, wherein the neighbor node is aware of the slot #n for the neighbor node to perform carrier sensing and a packet size of the neighbor node, and is aware of whether carrier sensing and transmission are possible before a start point of a Guaranteed Time Slot (GTS).

9. The control method of claim 2, wherein the obtaining comprises:
   receiving, by the neighbor node, beacon information from the center node;
   transmitting, by the neighbor node having received the beacon information, an association request to the center node; and
   receiving, by the neighbor node, association information from the center node based on the transmitted association request.

10. The control method of claim 1, wherein, in the obtaining of the seed, a seed is assigned as a value which is one larger than a total number of the associated neighbor nodes.

11. An apparatus using the control method for collision avoidance in wireless sensor communication recited in claim 1.

12. A center node for collision avoidance control in wireless sensor communication including a center node and a plurality of neighbor nodes, the center node comprising:
   a non-transitory computer-readable medium which has stored thereon computer-executable instructions to cause a processor to:
   send beacon information to a neighbor node; and
   assign a seed which is set to a total number of neighbor nodes associated with the center node to the neighbor node associated with the center node by transmitting association information in response to an association request received from the neighbor node,
   wherein the seed is used for determining a slot #n in which the neighbor node performs a carrier sensing operation, and the n is an integer more than 0.

13. The center node of claim 12, wherein the association information includes one of association response information and beacon information.

14. The center node of claim 12, wherein the association information includes a total number of associated neighbor nodes, a size of a contention access period, a short address, and seed information.

15. A neighbor node for collision avoidance control in wireless sensor communication including a center node and a plurality of neighbor nodes, the neighbor node comprising:
   a non-transitory computer-readable medium which has stored thereon computer-executable instructions to cause a processor to:
   transmit an association request to the center node,
   update a seed assigned by the center node at each radio frame, wherein the seed was set to a total number of neighbor nodes associated with the center node
   perform a carrier sensing operation in a slot #n which is determined based on the updated seed, and
   when the slot #n is determined to be an idle state by the carrier sensing operation, transmit data in a slot #(n+1) after the slot #n,
   wherein the n is an integer more than 0.

16. The neighbor node of claim 15, further comprising:
   the processor determining a criterion for performing communication that allows communication to be performed when a maximum number of slots for the neighbor node to transmit the data is equal to or larger than a packet size of the neighbor node, after updating the seed assigned by the center node at each radio frame.

17. The neighbor node of claim 15, wherein the processor decreases a seed value one at a time, and the seed is assigned in a cycle of a total number of the associated neighbor nodes.

* * * * *